(12) United States Patent
Valembois et al.

(10) Patent No.: US 7,036,423 B2
(45) Date of Patent: May 2, 2006

(54) RELEASED CONTROL RELEASE MECHANISM IN PARTICULAR FOR USE IN THE SPACE INDUSTRY

(75) Inventors: Guy Valembois, Blagnac (FR); Dominique Medus, L'Union (FR)

(73) Assignee: Etienne Lacroix Tous Artifices S.A., (FR)

( * ) Notice: Subject to any disclaimer, the term of this patent is extended or adjusted under 35 U.S.C. 154(b) by 447 days.

(21) Appl. No.: 10/239,767

(22) PCT Filed: Mar. 22, 2001

(86) PCT No.: PCT/FR01/00870

§ 371 (c)(1),
(2), (4) Date: Nov. 29, 2002

(87) PCT Pub. No.: WO01/73301

PCT Pub. Date: Oct. 4, 2001

(65) Prior Publication Data

US 2004/0094673 A1 May 20, 2004

(30) Foreign Application Priority Data

Mar. 24, 2000 (FR) .................................. 00 003815

(51) Int. Cl.
*F15B 15/19* (2006.01)
(52) U.S. Cl. ..................................... 92/151; 244/137.4
(58) Field of Classification Search ................. 92/151; 244/131, 137.4, 161
See application file for complete search history.

(56) References Cited

U.S. PATENT DOCUMENTS

| 3,186,163 | A | | 6/1965 | Dixon |
| 3,242,666 | A | * | 3/1966 | Peterson ...................... 244/147 |
| 4,158,322 | A | | 6/1979 | Hardesty |
| 4,263,839 | A | | 4/1981 | Akkerman et al. |
| 4,682,804 | A | * | 7/1987 | Palmer et al. .............. 244/161 |
| 5,395,149 | A | * | 3/1995 | Herman et al. .......... 244/137.4 |

FOREIGN PATENT DOCUMENTS

| EP | 0657326 A | 6/1995 |
| FR | 1558534 | 2/1969 |
| WO | WO8607427 | 12/1986 |

* cited by examiner

*Primary Examiner*—Thomas E. Lazo
(74) *Attorney, Agent, or Firm*—Blakely, Sokoloff, Taylor & Zafman

(57) ABSTRACT

The invention concerns a device forming a mechanism, in particular for use in the space industry, characterised in that it comprises in combination: two structural elements (100, 200) capable of relative displacement, locking means (300) adapted to prevent initially the relative displacement between the two structural elements (100, 200), and means (400) for controlled locking of the locking means (300) designed to prevent initially the release thereof, then when activated, successively, in a first phase, a sliding action in controlled amplitude of the locking means (300), for limited release between the two structural elements (100, 200), then in a second phase, complete release of the locking means (300) and hence of the structural elements (100, 200).

29 Claims, 1 Drawing Sheet

RELEASED CONTROL RELEASE MECHANISM IN PARTICULAR FOR USE IN THE SPACE INDUSTRY

Figure 1:
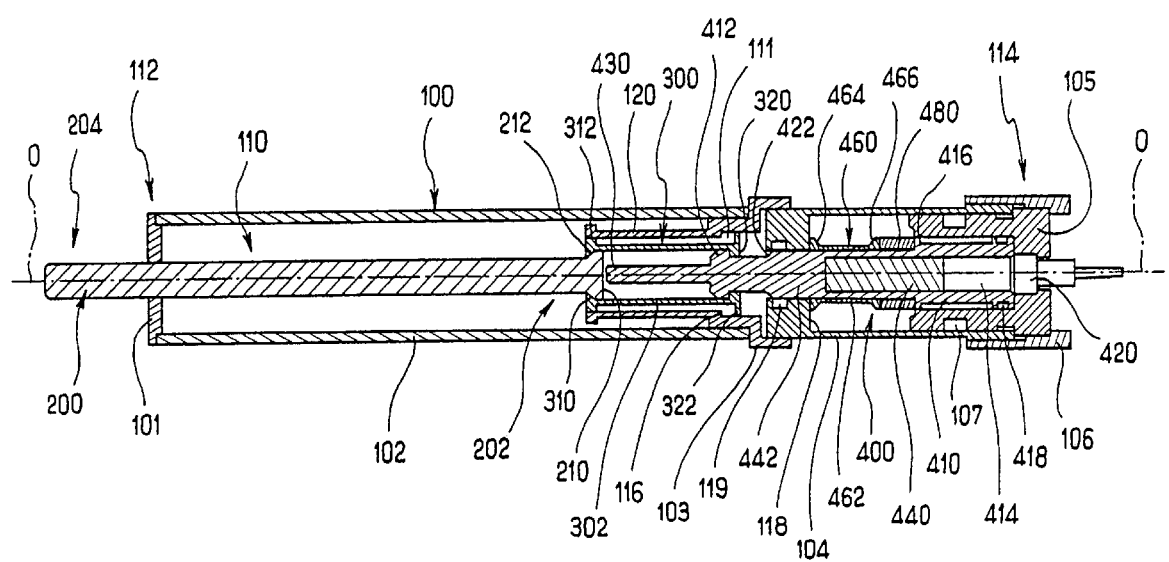

The present patent application is a non-provisional application of International Application No. PCT/FR01/00870, filed Mar. 22, 2001.

The present invention relates to the field of controlled release mechanisms, particularly but not exclusively pyromechanisms, i.e. the field of mechanisms controlled by a-pyrotechnical effect.

A particular but non-exclusive application of the present invention lies in the space industry, e.g. on launchers or satellites.

Known means actuated by a thermal effect, in particular known pyrotechnical means, provide a wide range of options. In particular, they provide high potential in terms of the amount of energy supplied for given onboard mass, and also a high level of reliability. They are also insensitive to electromagnetic radiation.

Nevertheless, those mechanisms also present a major drawback, namely: the high level of dynamic shock induced in their operation.

Such levels of shock and vibration often make it impossible to use fragile equipment in the vicinity thereof.

An object of the present invention is to provide a novel mechanism that does not present the above-mentioned drawback.

In the present invention, this object is achieved by equipment comprising in combination:

two structural elements suitable for relative displacement;
blocking means suitable initially for preventing relative displacement between the two structural elements; and
locking means for controlled locking of the blocking means, suitable initially for preventing any release thereof, then on command, and successively, initially causing the blocking means to slide through a controlled amplitude suitable for releasing stress between the two structural elements, and then in a second stage causing complete (and possibly forced) release of the blocking means and thus of the structural elements.

According to an advantageous characteristic of the present invention, the locking means comprise at least one element made of low-melting point material, and heater means of suitable power, for example a highly exothermal pyrotechnical composition.

According to another advantageous characteristic of the present invention, the locking means comprise two redundant and/or complementary elements.

According to another advantageous characteristic of the present invention, the locking means comprise a ring soldered by means of a low-melting point material to one of the structural elements capable of relative displacement.

According to another advantageous characteristic of the present invention, said ring is formed by a structure suitable for collapsing on melting of the solder material.

According to another advantageous characteristic of the present invention, the locking means comprise a block of low-melting point material forming an abutment against displacement.

According to another advantageous characteristic of the present invention, the blocking means comprise a clamp structure engaged with one of the structural elements capable of relative displacement.

Other characteristics, objects, and advantages of the present invention appear on reading the following detailed description given with reference to the accompanying drawing which, by way of non-limiting example, shows a longitudinal axial section view of a device in accordance with the present invention in its initial, storage position.

The device shown in the accompanying FIGURE comprises two structural elements 100, 200 capable of relative displacement, blocking means 300, and locking means 400.

The structural elements 100 and 200 may be implemented in numerous ways, in particular by being suitable for fitting to the external interfaces of the means that they drive.

In the preferred embodiment shown in the accompanying FIGURE, one of the elements 100 is constituted by a stationary housing that is generally annular about an axis O—O.

More precisely, in the embodiment shown in the accompanying FIGURE, the element 100 comprises an assembly of six parts 101, 102, 103, 104, 105, and 106 which are described in greater detail below. Nevertheless, the invention is not limited to this particular embodiment.

The second structural element 200 is constituted by a rigid rectilinear rod centered on the axis O—O.

The housing 100 possesses an internal chamber 110 having multiple cavities housing the blocking means 300 and the locking means 400.

The structural element 200 passes through an end one of the elements 101 of the housing 100, which element forms an end partition extending transversely to the axis O—O.

In order to simplify the description, this end 112 of the housing 100 through which the element 200 emerges is referred to below by convention as the "upstream" end, and the opposite end 114 of the housing is referred as the "downstream" end.

The structural element 200 is thus capable of sliding in translation relative to the housing 100 along the axis O—O once it has been released by the blocking means 300.

The present invention preferably applies to configurations in which the element 200 is urged resiliently out from the housing 100 by auxiliary means that are not shown in the accompanying FIGURE.

It should be observed that the element 200 is provided with an annular projection 210 on its free end 202 inside the housing 100. This projection 210 co-operates with the blocking means 300.

The projection 210 is preferably defined by a frustoconical surface 212 facing towards the end 204 of the element 200 lying outside the housing 100, and converging towards said end 204.

The blocking element 300 is preferably constituted by a clamp suitable for taking hold of the above-mentioned projection 210 so as to prevent any movement of the element 200, initially.

The clamp preferably comprises a plurality of shells uniformly distributed around the axis O—O and confined at rest by the housing 100 so as to engage with the projection 210 on the rod 200.

Nevertheless, the clamp 300 can move in translation relative to the housing once it has been released by the associated locking means 400 so as to escape from the confinement means constituted by the housing 100, thereby serving in turn to release the rod 200.

Each shell of the clamp 300 preferably comprises a partition in the form of a cylindrical sector 302 provided at each of its ends both with an inner rib and with an outer rib.

At the upstream end, the inner and outer ribs are referenced 310 and 312 respectively, while at the downstream end, the inner and outer ribs are referenced 320 and 322, respectively.

The upstream inner ribs 310 are of a shape that is complementary to the projection 210, and are adapted to co-operate therewith. In the initial rest position, as shown in the accompanying FIGURE, the shells forming the clamp 300 are pressed together close to the axis O—O, so that the inner ribs form an upstream abutment for the projection 210. The clamp 300 thus holds the rod 200 axially and prevents it from being extracted.

The upstream outer ribs 312 are placed in a complementary sheath 120 formed inside the housing 100.

Thus, in the initial, rest position, the outer ribs 312 rest against the inside periphery of the sheath 120 and prevent the clamp 300 from expanding.

Nevertheless, once the outer ribs 312 have gone beyond the upstream end of the sheath 120, due to the clamp 300 sliding along the axis O—O, said outer ribs 312 escape from the sheath 120. The shells making up the clamp 300 can then expand and release the rod 200.

In this respect, the person skilled in the art will understand that the co-operation defined between the frustoconical surfaces of the projection 210 and the ribs 310 tends to expand the clamp due to the axial force exerted on the rod 200.

At rest, the outer ribs 312 preferably lie flush with the upstream end of the sheath 120. The axial extent of the ribs 312 is preferably about 2 millimeters (mm). The person skilled in the art will thus understand that it suffices for the clamp to slide through 2 mm in order to allow the ribs 312 of the clamp 300 to escape from the sheath 120, thereby allowing the clamp 300 to expand and releasing the rod 200.

The downstream inner ribs 320 co-operate with a piston 410 belonging to the locking means 400.

The piston 410 is capable of moving in translation along the axis O—O relative to the housing 100. Nevertheless, the piston 410 is initially prevented from moving inside the housing 100 by means that are described in greater detail below.

More precisely, at rest, the ribs 320 are placed downstream from an annular bead 412 formed on the piston 410. Thus, so long as the piston 410 is prevented from moving inside the housing 100, the co-operation defined between the bead 412 and the ribs 320 prevents the clamp 300 from moving.

The downstream outer ribs 322 are placed in a complementary cylindrical segment 111 of the chamber 110, downstream from an annular step 116 formed by said segment 111. At rest, the distance between the step 116 and the outer ribs 322 is greater than the amplitude of the sliding needed to enable the clamp 300 to escape from the sheath 120.

The amplitude of movement in translation performed by the clamp 300 is thus restricted by the ribs 322 coming into abutment against the step 116.

In addition to the piston 410, the locking means 400 comprise heater means 440, preferably in the form of a pyrotechnical composition, a ring 460, and a block of low-melting point material 480, preferably a metal.

As will be understood on reading the detailed description below, the ring 460 and the block of low-melting point material constitute two redundant means.

The pyrotechnical composition 440 is preferably mixed or combined with powder suitable for generating gas capable of propelling the piston 410 towards the upstream end of the housing 100 once the composition has been fired.

The pyrotechnical composition 440 is placed in a blind chamber 414 of the piston 410. This blind chamber 414 opens out to the downstream end of the piston 410 facing an initiator 420, preferably an electrical initiator, carried by the part 105 of the housing that constitutes the downstream end 114 thereof.

More precisely, the pyrotechnical composition 440 is placed downstream from a block of earth 442 placed at the blind end of the chamber 414.

In the vicinity of its downstream end, the piston 410 is provided with an outer annular rib 416.

The ring 460 and the block of low-melting point metal 480 are placed axially in series between said annular rib 416, on the upstream side thereof, and an annular step 118 formed in the housing 100 and facing towards the downstream end 114 of the housing 100.

In the embodiment shown in the accompanying FIGURE, the ring 460 is placed upstream from the block of metal 480.

The ring 460 is placed around the piston 410. It is generally waisted in shape. Thus, the ring comprises a central cylinder 462 of small wall thickness with respective flanges 464 and 466 at each of its two ends.

The upstream flange 464 rests against the step 118. The downstream flange 466 rests against the block of low-melting point metal 480.

The inside diameter of the ring 460 is complementary to the local diameter of the piston 410. In addition, the ring 460 is soldered to the piston 410 by means of a low-melting point metal.

The machined thickness of the central cylinder 462 is determined in such a manner that once the solder has melted, due to the exothermal composition 440 being fired, the axial force applied to the rod 200 by the outside environment, which force is transferred to the clamp 300 and to the piston 410, causes the cylinder 462, and thus the ring 460, to collapse.

In other words, the ring 460 is designed to be incapable of its own of withstanding the prestress applied by the outside environment. Nevertheless, once soldered to the piston 410, the ring 460 is prevented from collapsing under the effect of the prestress.

The block of low-melting point metal 480 is in the form of a ring placed around the piston 410 between the flange 466 of the ring 460 and the rib 416 of the piston 410.

It should be observed that the axial position of the exothermal composition 440 inside the chamber 414 of the piston 410 is determined in such a manner that said exothermal composition 440 is in register with the ring 460 and with the block of low-melting point metal 480. Thus, when the exothermal composition 440 is fired, it causes the solder of the ring 460 to melt and then the block 480 to melt in succession.

It should also be observed that the device preferably includes means for providing sealing for the portion of the chamber 110 which houses the locking means 400.

For this purpose, a sealing ring is preferably provided in a groove 107 between two elements 104 and 105 of the housing 100, and two sealing rings are provided on the ends of the piston 410, one between the piston and the step 118, and the other between the piston and a downstream segment of the housing. In the embodiment shown in the accompanying FIGURE, these last-mentioned two sealing rings are placed respectively in a groove 119 formed in the segment of the housing 100 that defines the step 118, and in a groove 418 formed in the periphery of the piston 410.

The piston 410 is preferably provided on its outer periphery, downstream from the clamp 300, with a frustoconical step 422 facing towards the upstream end 112 of the housing 100. Where necessary, if the force exerted on the clamp 300 by the rod 200 is not sufficient to move the clamp after the exothermal composition 440 has been fired, then this step 422 can act on the ribs 320 so as to cause the clamp to move axially and then open.

Furthermore, it can be seen in the accompanying drawing that the piston 410 possesses an axial extension 430 at its upstream end, which extension rests against the downstream end of the rod 200 in order to force displacement of the rod 200 during displacement of the piston 410.

By way of non-limiting example, the low-melting point metal constituting the block 480 and the solder for the ring 460 can have the following composition:

Bi50/Pb28/Sn22 (for a melting temperature of about 95° C. to 110° C.); or

In (for a melting temperature of about 156° C.), or

Sn or Sn85/Zn15 (for a melting temperature of about 200° C. to 250° C.); or

Pb82.5/Cd17.5; or

Pb96/Sb4 (for a melting temperature of about 250° C. to 300° C.); while the pyrotechnical composition 440 can be as follows:

Al+$Fe_2O_3$; or

Mg+$Fe_2O_3$; or

Al+CuO; or

Mg+CuO.

The device operates essentially as follows.

In the rest position, the piston 410 is prevented from moving in translation inside the housing 100 by the soldered ring 460 and by the block of low-melting point metal 480 which are interposed axially in series between the step 118 and the rib 416 on the piston 410. Consequently, the piston 410 acts via its rib 412 to hold the clamp 300 in the sheath 120. With the clamp 300 thus being prevented from expanding, it in turn holds the rod 200 via its inner ribs 212.

When the exothermal composition 440 is fired by means of the initiator 420, the ring 460 is initially unsoldered, thereby causing it to collapse so that its cylinder 460 crumples axially. The piston 410 can then move axially inside the housing 100 towards the upstream end 112. The clamp 300 can thus also move in translation under the effect of the traction exerted on the rod 200. During this sliding of the clamp 300, the stresses in the drive train acting on the rod 200 are released. The clamp 300 expands as soon as the outer ribs 312 escape from the sheath 120. The rod 200 is thus released.

Furthermore, the block of low-melting point metal 480 is also melted by the heat given off by the composition 440. As a result, in the event of the ring 460 failing to operate, i.e. failing to collapse, the above-mentioned operation is nevertheless ensured (i.e. the piston moves, followed by the clamp).

The block 480 thus provides a redundant effect guaranteeing that the device will operate in the expected manner.

It should also be observed that, where necessary, if the force exerted on the rod 200 by the outside environment is not sufficient to ensure that the piston 410 and the rod 200 move, then the expansion of the gas generated by the composition will ensure that the piston 410 moves, and consequently causes the clamp 300 firstly to move and then to expand by means of the step 422, and secondly causes the rod 200 to move under drive from the extension 430.

The person skilled in the art will understand that the structure as proposed above in the context of the present invention serves initially to release stresses gently, prior to ensuring that the system is released definitively.

The structure proposed in the present invention also provides the advantage of enabling the displacement speed of the piston 410 to be controlled by throttling the molten solder metal.

Naturally, the present invention is not limited to the particular embodiment described above, but extends to any variant within its spirit.

In particular, in the present invention:

the highly exothermal pyrotechnical composition 440 may be replaced by any suitable equivalent heater means, for example electrical heater means; and the low-melting point metal 460, 480 may be replaced by any other suitable material, e.g. paraffin, eutectic alloys, etc . . .

What is claimed is:

1. A mechanism-forming device, in particular for use in space, the device comprising:

two structural elements (100, 200) suitable for relative displacement;

blocking means (300) suitable initially for preventing relative displacement between the two structural elements (100, 200); and locking means (400) for controlled locking of the blocking means (300), suitable initially for preventing any release thereof, then on command, and successively, initially causing the blocking means (300) to slide through a controlled amplitude suitable for releasing stress between the two structural elements (100, 200) and then in a second stage causing complete release of the blocking means (300) and thus of the structural elements (100, 200), wherein the locking means (400) comprise at least one element (460, 480) made of low-melting point material, and heater means (440) of suitable power.

2. The device according to claim 1, wherein the locking means (400) comprise two redundant elements (460, 480).

3. The device according to claim 1, wherein the low-melting point material is a metal.

4. The device according to claim 1, wherein the heater means is a highly exothermal pyrotechnical composition (440).

5. A mechanism-forming device, in particular for use in space, the device comprising:

two structural elements (100, 200) suitable for relative displacement; blocking means (300) suitable initially for preventing relative displacement between the two structural elements (100, 200); and locking means (400) for controlled locking of the blocking means (300), suitable initially for preventing any release thereof, then on command, and successively, initially causing the blocking means (300) to slide through a controlled amplitude suitable for releasing stress between the two structural elements (100, 200) and then in a second stage causing complete release of the blocking means (300) and thus of the structural elements (100, 200), wherein the locking means (400) comprise at least one element (460, 480) made of low-melting point material, and heater means (440) of suitable power, the locking means (400) comprise a ring (460) soldered by means of a low-melting point material to one of the structural elements (200) capable of relative displacement.

6. The device according to claim 5, wherein the ring (460) is formed by a structure suitable for collapsing on melting of the solder material.

7. The device according to claim 5, wherein the ring (460) and a block of low-melting point material (480) are placed axially in series between an annular rib (416) of a piston (410) and an annular step (118) formed in a housing (100).

8. The device according to claim 5, wherein the ring (460) comprises a thin walled central cylinder (462) and respective flanges (464, 466) at its two ends.

9. A mechanism-forming device, in particular for use in space, the device comprising:
two structural elements (100, 200) suitable for relative displacement; blocking means (300) suitable initially for preventing relative displacement between the two structural elements (100, 200); and
locking means (400) for controlled locking of the blocking means (300), suitable initially for preventing any release thereof, then on command, and successively, initially causing the blocking means (300) to slide through a controlled amplitude suitable for releasing stress between the two structural elements (100, 200) and then in a second stage causing complete release of the blocking means (300) and thus of the structural elements (100, 200), wherein the locking means (400) comprise at least one element (460, 480) made of low-melting point material, and heater means (440) of suitable power, the locking means (400) comprise a block (480) of low-melting point material forming an abutment against displacement.

10. A mechanism-forming device, in particular for use in space, the device comprising:
two structural elements (100, 200) suitable for relative displacement; blocking means (300) suitable initially for preventing relative displacement between the two structural elements (100, 200); and locking means (400) for controlled locking of the blocking means (300), suitable initially for preventing any release thereof, then on command, and successively, initially causing the blocking means (300) to slide through a controlled amplitude suitable for releasing stress between the two structural elements (100, 200) and then in a second stage causing complete release of the blocking means (300) and thus of the structural elements (100, 200), wherein the locking means (400) comprise at least one element (460, 480) made of low-melting point material, and heater means (440) of suitable power, the blocking means (300) comprise a clamp structure engaged with one of the structural elements (200) capable of relative displacement.

11. The device according to claim 10, wherein one of the structural elements (100) is constituted by a stationary housing that is generally annular about an axis 0—0, while the second structural element (200) is formed by a rigid rectilinear rod centered on the axis 0—0.

12. The device according to claim 10, wherein the two structural elements (100, 200) are suitable for relative displacement in translation.

13. The device according to claim 10, wherein one of the structural elements (200) is provided with an annular projection (210) which cooperates with the clamp of the blocking means (300).

14. The device according to claim 13, wherein the projection (210) is defined by a frustoconical surface (212) which tends to urge the clamp (300) into an open position.

15. The device according to claim 10, wherein the clamp (300) is made up of a plurality of shells uniformly distributed around the axis 0—0 of the device and confined at rest by a housing (100).

16. The device according to claim 10, wherein the clamp (100) is capable of moving in translation relative to the housing of the device once released by the locking means (400) so as to escape from the confinement means formed by the housing (100).

17. The device according to claim 15, wherein each shell of the clamp (300) comprises a partition in the form of a cylindrical sector (302), provided at each of its ends both with an inner rib (310, 320) and with an outer rib (312, 322).

18. The device according to claim 10, wherein the clamp (300) possesses upstream cuter ribs (312) placed in a complementary sheath (120) formed in the housing (100).

19. The device according to claim 18, wherein, at rest, the outer ribs (312) are flush with the upstream end of the sheath (120) and the axial extent of the ribs (312) is preferably about 2 mm.

20. The device according to claim 10, wherein the clamp (300) cooperates with a piston (410) capable of moving in translation along the axis 0—0 relative to the housing (100) but prevented initially from moving inside the housing (100) by low-melting point means.

21. The device according to claim 20, wherein the piston (410) possesses a bead (412) forming an abutment for ribs (320) formed on the clamp (300).

22. The device according to claim 10, further including a composition (440) containing a compound suitable for generating gases suitable for applying a propulsion effect on a piston (410).

23. The device according to claim 22, wherein the composition which generates the gas is a pyrotechnical composition.

24. The device according to claim 10, further including a piston (410) provided on its outer periphery, downstream from the clamp (300) with a frustoconical step (422) suitable for causing the clamp to move axially and then to open.

25. A mechanism-forming device, in particular for use in space, the device comprising:
two structural elements (100, 200) suitable for relative displacement; blocking means (300) suitable initially for preventing relative displacement between the two structural elements (100, 200); and
locking means (400) for controlled locking of the blocking means (300), suitable initially for preventing any release thereof, then on command, and successively, initially causing the blocking means (300) to slide through a controlled amplitude suitable for releasing stress between the two structural elements (100, 200) and then in a second stage causing complete release of the blocking means (300) and thus of the structural elements (100, 200), wherein the locking means (400) comprise at least one element (460, 480) made of low-melting point material, and heater means (440) of suitable power, the two structural elements (100, 200) are urged resiliently apart.

26. A mechanism-forming device, in particular for use in space, the device comprising:
two structural elements (100, 200) suitable for relative displacement; blocking means (300) suitable initially for preventing relative displacement between the two structural elements (100, 200);
locking means (400) for controlled locking of the blocking means (300), suitable initially for preventing any release thereof, then on command, and successively, initially causing the blocking means (300) to slide through a controlled amplitude suitable for releasing stress between the two structural elements (100, 200) and then in a second stage causing complete release of the blocking means (300) and thus of the structural elements (100, 200), wherein the locking means (400) comprise at least one element (460, 480) made of low-melting point material, and heater means (440) of suitable power; and a piston (410) possessing an axial extension (430) resting against one end of one of the structural elements (200) to force displacement of said element during displacement of the piston (410).

27. A mechanism-forming device, in particular for use in space, the device comprising:

two structural elements (100, 200) suitable for relative displacement; blocking means (300) suitable initially for preventing relative displacement between the two structural elements (100, 200); and locking means (400) for controlled locking of the blocking means (300), suitable initially for preventing any release thereof, then on command, and successively, initially causing the blocking means (300) to slide through a controlled amplitude suitable for releasing stress between the two structural elements (100, 200) and then in a second stage causing complete release of the blocking means (300) and thus of the structural elements (100, 200), wherein the locking means (400) comprise at least one element (460, 480) made of low-melting point material, and heater means (440) of suitable power, wherein the locking means comprise a low-melting point material which is selected from the group comprising paraffin and eutectic alloys.

28. A mechanism-forming device, in particular for use in space, the device comprising:

two structural elements (100, 200) suitable for relative displacement; blocking means (300) suitable initially for preventing relative displacement between the two structural elements (100, 200); and locking means (400) for controlled locking of the blocking means (300), suitable initially for preventing any release thereof, then on command, and successively, initially causing the blocking means (300) to slide through a controlled amplitude suitable for releasing stress between the two structural elements (100, 200) and then in a second stage causing complete release of the blocking means (300) and thus of the structural elements (100, 200), wherein the locking means (400) comprise at least one element (460, 480) made of low-melting point material, and heater means (440) of suitable power, wherein the locking means include heater means which comprise electrical heater means.

29. A mechanism-forming device, in particular for use in space, the device comprising:

two structural elements (100, 200) suitable for relative displacement; blocking means (300) suitable initially for preventing relative displacement between the two structural elements (100, 200);

locking means (400) for controlled locking of the blocking means (300), suitable initially for preventing any release thereof, then on command, and successively, initially causing the blocking means (300) to slide through a controlled amplitude suitable for releasing stress between the two structural elements (100, 200) and then in a second stage causing complete release of the blocking means (300) and thus of the structural elements (100, 200), wherein the locking means (400) comprise at least one element (460, 480) made of low-melting point material, and heater means (440) of suitable power; and at least one element (410) whose displacement is controlled by throttling a low-melting point material (460, 480).

* * * * *